(12) United States Patent
Clauss

(10) Patent No.: US 7,651,808 B2
(45) Date of Patent: Jan. 26, 2010

(54) SPACER ELEMENT FOR A FUEL CELL STACK

(75) Inventor: Jürgen Clauss, Bad Urach (DE)

(73) Assignee: ElringKlinger AG, Dettingen (DE)

( * ) Notice: Subject to any disclaimer, the term of this patent is extended or adjusted under 35 U.S.C. 154(b) by 648 days.

(21) Appl. No.: 11/008,058

(22) Filed: Dec. 9, 2004

(65) Prior Publication Data

US 2005/0181265 A1 Aug. 18, 2005

(30) Foreign Application Priority Data

Dec. 13, 2003 (DE) ................................ 103 58 457

(51) Int. Cl.
*H01M 8/02* (2006.01)
(52) U.S. Cl. .............................. 429/38; 429/34; 429/39
(58) Field of Classification Search ........................ None
See application file for complete search history.

(56) References Cited

U.S. PATENT DOCUMENTS

2003/0017377 A1 * 1/2003 Diez ........................... 429/34

FOREIGN PATENT DOCUMENTS

EP 1 278 258 A2 1/2003

\* cited by examiner

*Primary Examiner*—Jonathan Crepeau
*Assistant Examiner*—Tony Chuo

(57) ABSTRACT

In order to provide a spacer element for a fuel cell stack that is simple and easy to manufacture and in the assembled state of the fuel cell stack lies adjacent to a first structural part of a fuel cell unit of the fuel cell stack and to a second structural part of a fuel cell unit of the fuel cell stack and holds the first structural part and the second structural part apart from one another, comprising a support wall with an inner side and an outer side and at least one gas through-channel penetrating the support wall from the inner side to the outer side, wherein the spacer element comprises at least two material layers, which are stacked one on top of the other along a stacking direction, it is proposed that at least one of the material layers comprises a carrier element, which extends in a peripheral direction of the spacer element, and at least two channel-delimiting elements, which project transversely of the peripheral direction from the carrier element and form lateral boundaries of a portion of a gas through-channel of the spacer element.

33 Claims, 8 Drawing Sheets

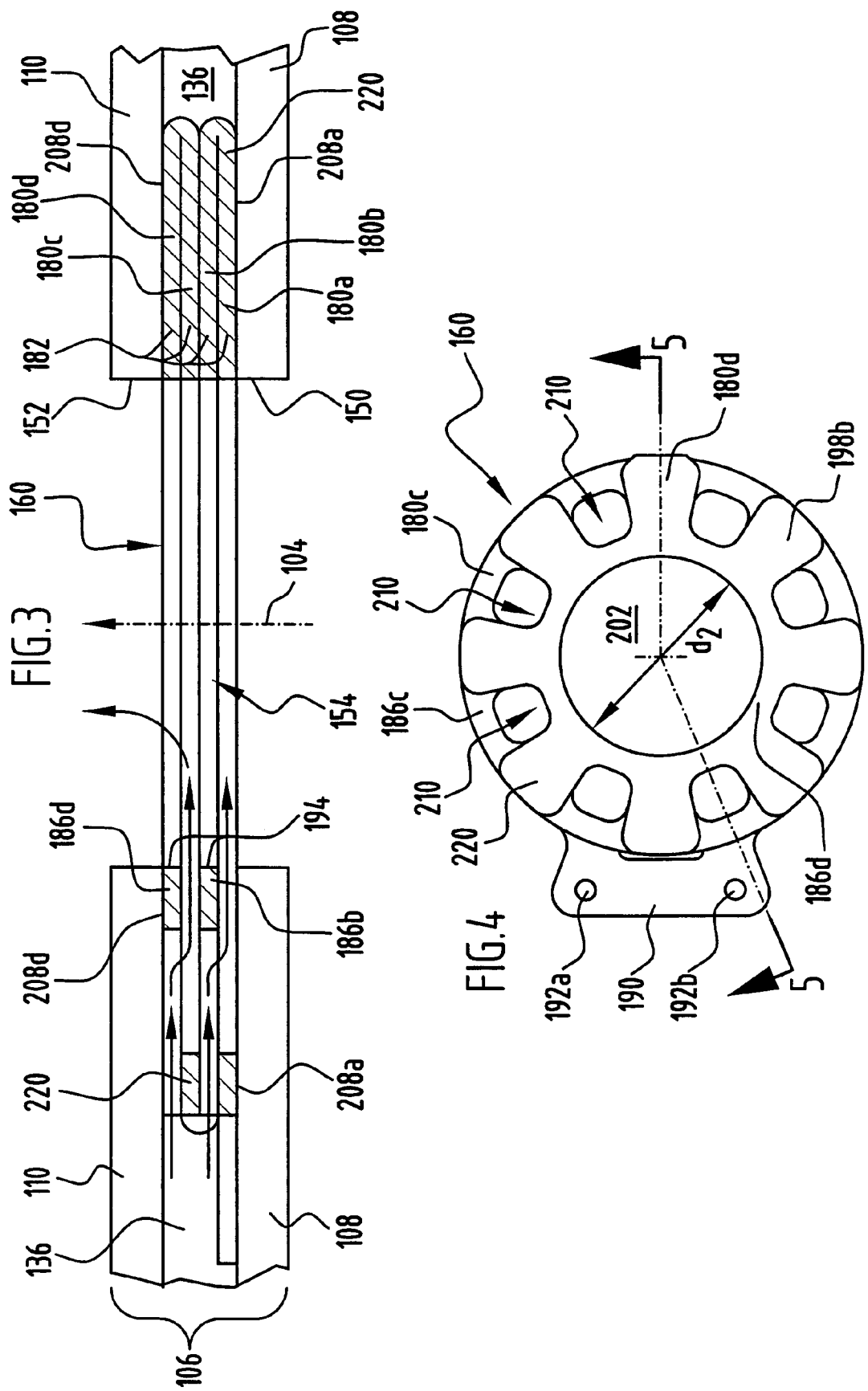

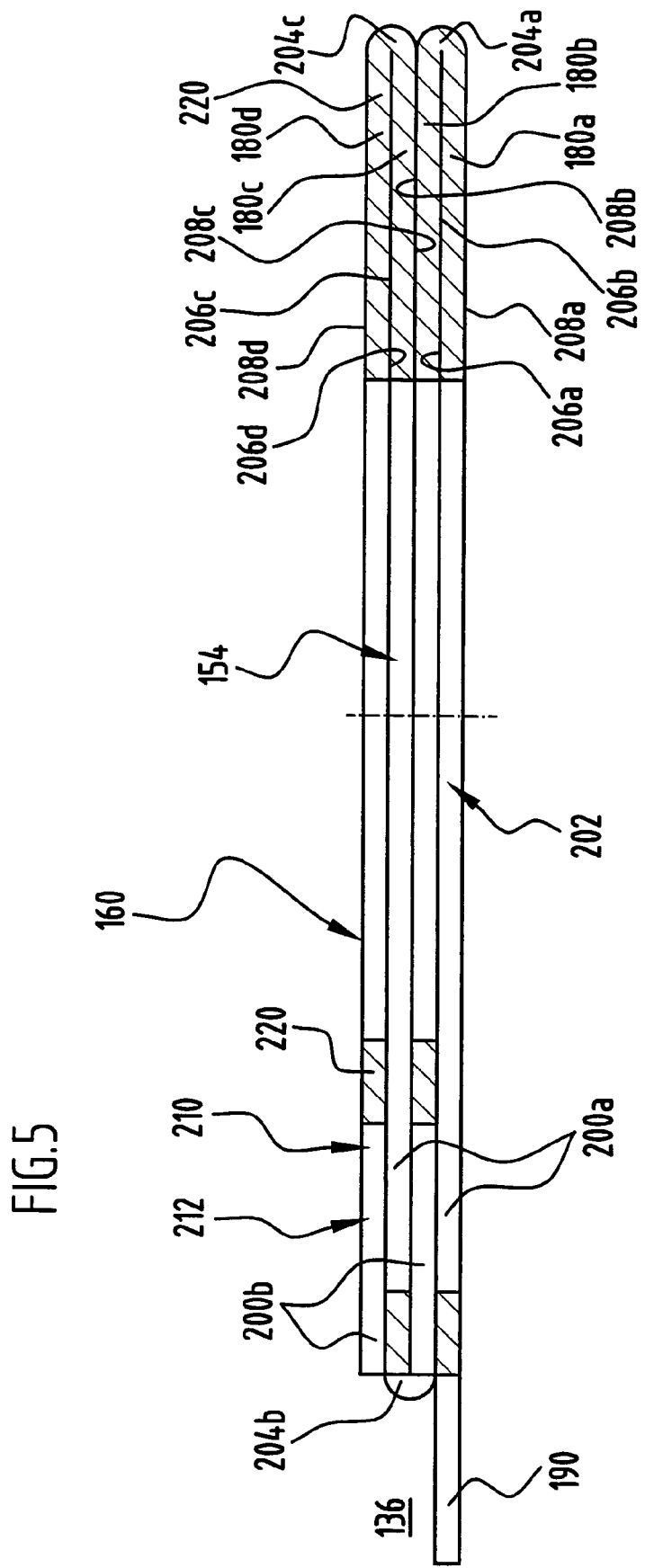

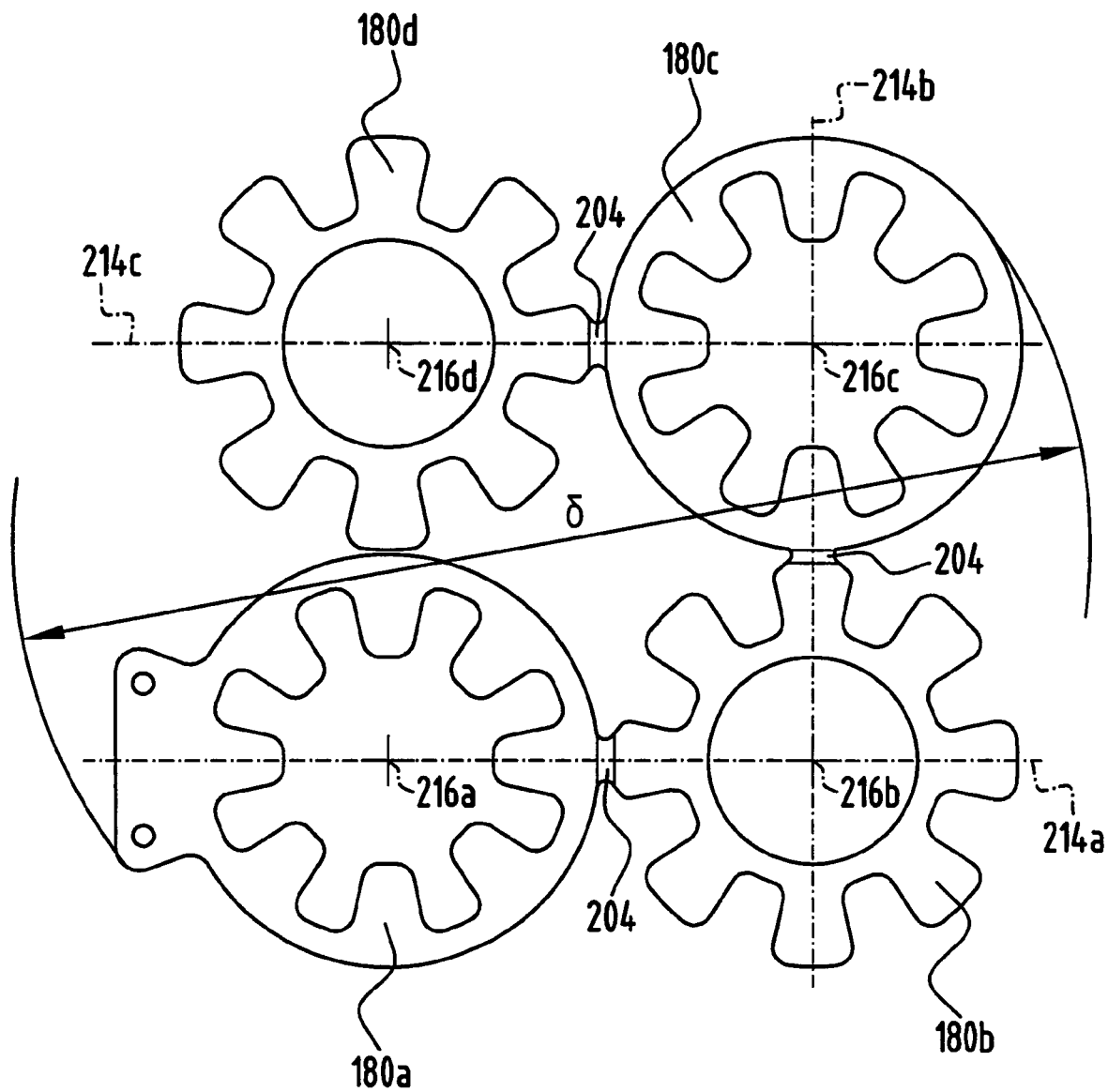

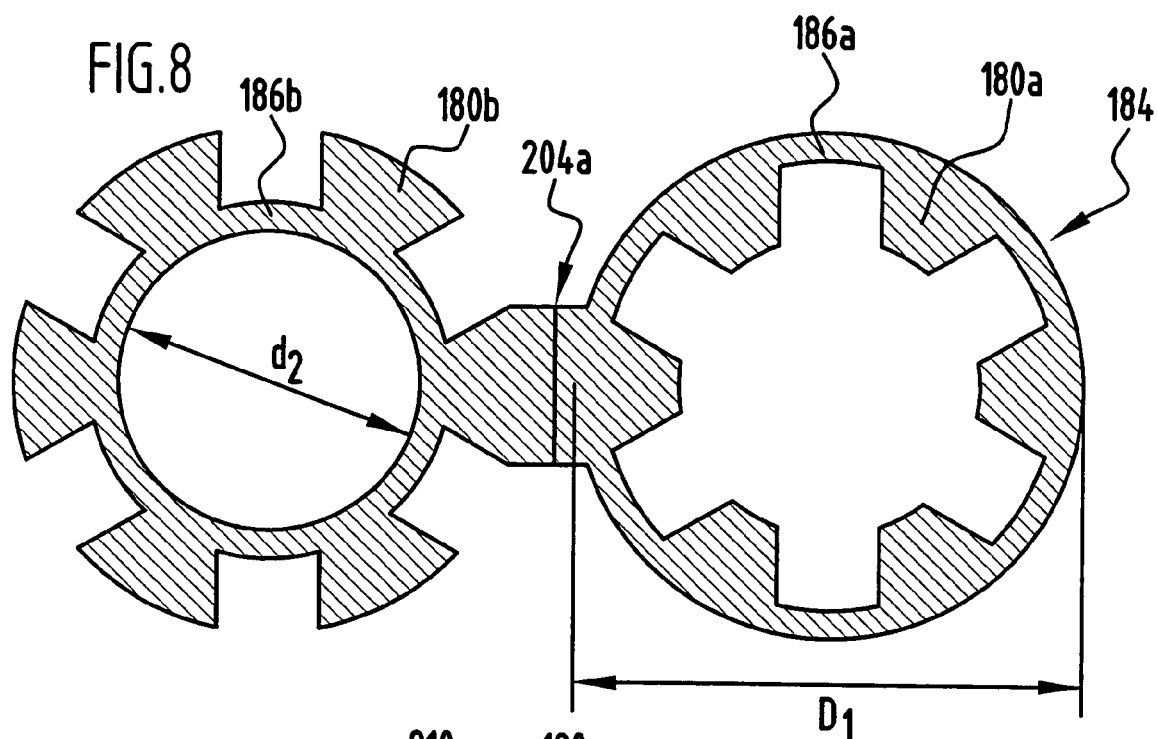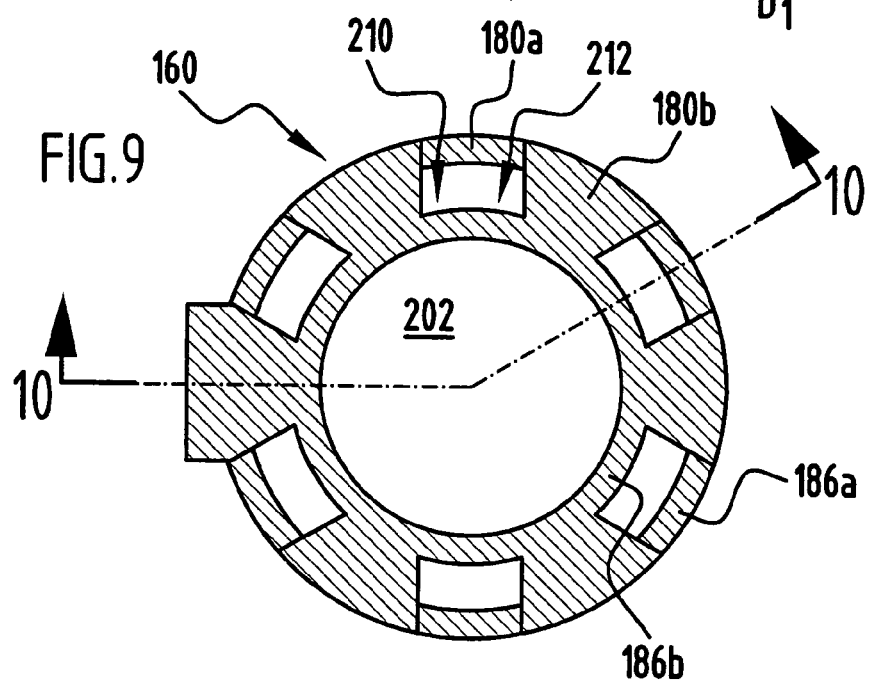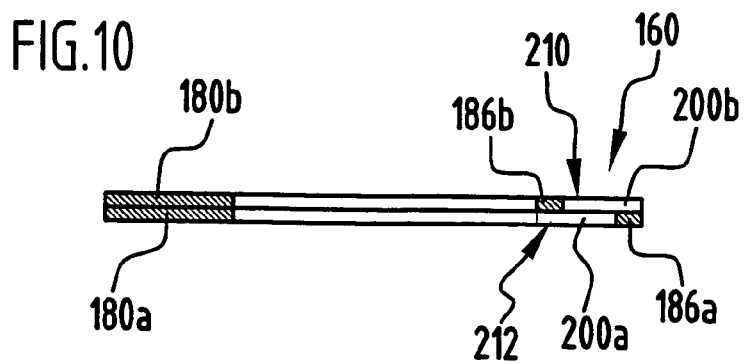

SPACER ELEMENT FOR A FUEL CELL STACK

The present disclosure refers to the subject matter disclosed in German patent application No. 103 58 457.9 of 13 Dec. 2003. The entire description of this earlier application is made an integral part of the present description by reference ("incorporation by reference").

BACKGROUND OF THE INVENTION

The present invention relates to a spacer element for a fuel cell stack that in the assembled state of the fuel cell stack lies adjacent to a first structural part of a fuel cell unit of the fuel cell stack and to a second structural part of a fuel cell unit of the fuel cell stack and holds the first structural part and the second structural part apart from one another, wherein the spacer element comprises a support wall with an inner side and an outer side and at least one gas through-channel penetrating the support wall from the inner side to the outer side and wherein the spacer element comprises at least two material layers, which are stacked one on top of the other along a stacking direction.

Such spacer elements for a fuel cell stack are known from EP 1 278 258 A2.

The spacer elements known from EP 1 278 258 A2 are formed in each case from a substantially flat spacer element blank, which comprises annular carrier elements and lugs projecting in radial direction from the annular carrier elements. To form the spacer element from this spacer element blank, the radially projecting lugs are folded onto the respective associated carrier element, and then the carrier elements with the lugs folded thereon are folded one on top of the other in such a way that in the finished folded spacer element material layers comprising only an annular carrier element alternate with material layers comprising only folded-back lugs, wherein between the lugs gas through-channels penetrating a support wall of the spacer element from its inner side to its outer side are formed.

The spacer elements disclosed in EP 1 278 258 A2 perform the desired function but their manufacture entails a large number of folding operations.

The underlying object of the present invention is to provide a spacer element of the initially described type, which is easy and quick to manufacture.

SUMMARY OF THE INVENTION

In a spacer element for a fuel cell stack having the features of the preamble of claim 1 this object is achieved according to the invention in that at least one of the material layers of the spacer element comprises a carrier element, which extends in a peripheral direction of the spacer element, and at least two channel-delimiting elements, which project transversely of the peripheral direction from the carrier element and form lateral boundaries of a portion of a gas through-channel of the spacer element.

The spacer element according to the invention differs from the known spacer elements according to EP 1 278 258 A2 in particular in that in the fully assembled state of the spacer element according to the invention the same material layer contains both a carrier element and at least two channel-delimiting elements projecting transversely to the peripheral direction from the carrier element, whereas in the spacer elements according to EP 1 278 258 A2 in the fully assembled state there are, on the one hand, material layers comprising exclusively a carrier element and, on the other hand, material layers comprising exclusively channel-delimiting elements but not a carrier element.

The development according to the invention of the spacer element makes it possible for the spacer element according to the invention to be manufactured from a spacer element blank in that only the material layers, which comprise in each case a carrier element and channel-delimiting elements disposed thereon, are folded one on top of the other, there being no need to fold the individual channel-delimiting elements over onto the respective associated carrier element.

A marked reduction in the required folding steps is thereby achieved, with the result that the spacer element according to the invention is easy and quick to manufacture.

In a preferred development of the spacer element according to the invention, it is provided that the carrier element, from which the channel-delimiting elements project, takes the form of a closed ring.

If the carrier element is substantially annular or part-annular, then it has proved particularly advantageous when the channel-delimiting elements project in substantially radial directions from the carrier element.

In order to form gas through-channels all having substantially the same flow cross section and hence achieve as uniform a flow as possible through the spacer element, it is advantageous when channel-delimiting elements projecting from the carrier element are disposed substantially equidistant from one another along the peripheral direction of the spacer element.

When the carrier element has an inner side facing a centre line of the material layer and an outer side facing away from the centre line of the material layer, the channel-delimiting elements may project from the inner side or the outer side of the carrier element.

In a preferred development of the spacer element, it is provided that all of the channel-delimiting elements, which project from the carrier element of a material layer, project either all from the inner side or all from the outer side of the carrier element.

Preferably, the spacer element comprises at least one first material layer having a first carrier element and at least two first channel-delimiting elements, which project from the first carrier element and form lateral boundaries of a first gas through-channel portion, and at least one second material layer having a second carrier element and at least two second channel-delimiting elements, which project from the second carrier element and form lateral boundaries of a second gas through-channel portion.

In this case, it is advantageous when the first carrier element and the second carrier element in the assembled state of the spacer element are mutually offset in such a way that between the first carrier element and the second carrier element there remains a space, which connects the first gas through-channel portion and the second gas through-channel portion to one another.

It is thereby guaranteed that gas may pass from the first through-channel portion of the first material layer into the second gas through-channel portion of the second material layer or, conversely, from the second gas through-channel portion of the second material layer into the first gas through-channel portion of the first material layer.

In particular, it may be provided that the first gas through-channel portion, the second gas through-channel portion and the gap between the carrier elements together form a gas through-channel, which connects the inner side of the support wall of the spacer element to the outer side of the support wall of the spacer element. It is thereby guaranteed that in the support wall of the spacer element a gas through-channel penetrating the support wall from its inner side to its outer side is formed even when the first gas through-channel portion does not extend through the entire first material layer and the second gas through-channel portion does not extend through the entire second material layer, but terminate in each case at the associated carrier element of the material layer.

The gas through-channel formed by the first gas through-channel portion of the first material layer, the second gas through-channel portion of the second material layer and the gap between the carrier elements is graduated in a stepped manner (viewed in a radial longitudinal section through the support wall).

When the first carrier element and the second carrier element each have an inner side facing the centre line of the respective material layer and an outer side facing away from the centre line of the respective material layer, then for producing a gas through-channel that penetrates the support wall of the spacer element it is advantageous when the first channel-delimiting elements project from the inner side of the first carrier element and the second channel-delimiting elements project from the outer side of the second carrier element or when, alternatively thereto, the first channel-delimiting elements project from the outer side of the first carrier element and the second channel-delimiting elements project from the inner side of the second carrier element.

In a preferred development of the spacer element, it is further provided that the first material layer and the second material layer are of a substantially flat design.

In particular, it may be provided that the first material layer and the second material layer are formed by removing, in particular by punching or cutting, from a substantially flat layer of a starting material, in particular of a sheet steel.

To enable ease of handling of the spacer element, it is advantageous when the first material layer and the second material layer are integrally connected to one another.

In particular, it may be provided that the first material layer and the second material layer are connected to one another by a region, which is bent in the assembled state of the spacer element.

In particular, it may be provided that a channel-delimiting element of the first material layer is connected to the carrier element of the second material layer by a region, which is bent in the assembled state of the spacer element.

Alternatively or in addition thereto, it may be provided that the carrier element of the first material layer is connected to a channel-delimiting element of the second material layer by a region, which is bent in the assembled state of the spacer element.

In principle, it might be provided that between the first and the second material layer of the spacer element one or more further material layers are disposed.

In a preferred development of the spacer element according to the invention, it is however provided that the first material layer and the second material layer lie flat against one another in the assembled state of the spacer element.

In said case, it may in particular be provided that at least one channel-delimiting element of the first material layer and at least one channel-delimiting element of the second material layer in the assembled state of the spacer element lie, preferably substantially congruently, flat against one another. In this way, as uniform a distribution as possible of the application force inside the support wall of the spacer element is achieved.

Preferably, the first material layer and the second material layer of the spacer element are folded one on top of the other in the assembled state of the spacer element.

The spacer element may alternatively comprise more than two, in particular at least three, material layers, which are folded one on top of the other in the assembled state of the spacer element.

In this case, it may be provided that the spacer element is formed from a substantially flat spacer element blank, in which the centres of the material layers lie on a straight connecting line.

Alternatively thereto, it may be provided that the spacer element is formed from a substantially flat spacer element blank, in which the centres of the first material layer and of the second material layer lie on a first straight connecting line and the centres of the second material layer and of the third material layer lie on a second straight connecting line, wherein the second straight connecting line is aligned transversely of, preferably substantially at right angles to, the first straight connecting line. The effect thereby achieved is that the spacer element blank has a compact external contour, thereby allowing optimum utilization of the starting material, from which the spacer element blank is removed.

When the spacer element comprises at least four material layers, which in the assembled state of the spacer element are folded one on top of the other, it may be provided that the centres of the third material layer and of the fourth material layer lie on a third straight connecting line, which is aligned transversely of, preferably substantially at right angles to, the second straight connecting line.

In this case, it may in particular be provided that the centres of the four material layers lie at the corner points of a square.

In order to be able to fasten the spacer element in a simple manner to a structural part of a fuel cell unit, it may be provided that at least one of the material layers comprises a fixing lug, which projects beyond the external contours of the remaining material layers of the spacer element.

The fixing lug may be connected in any desired manner, in particular by welding and/or glueing and/or soldering, to a structural part of a fuel cell unit.

In principle, it might be provided that the spacer element is formed integrally with the first structural part and/or integrally with the second structural part of a fuel cell unit, between which the spacer element is disposed.

In a preferred development of the invention, it is however provided that the spacer element takes the form of a part that is separate from the first structural part and from the second structural part.

To achieve a good introduction of the application force into the support wall of the spacer element, it is preferably provided that the spacer element in the assembled state lies with a first contact surface flat against the first structural part and with a second contact surface flat against the second structural part.

In particular, it may be provided that the first structural part has a first gas through-opening and the second structural part has a second gas through-opening and that the spacer element has an interior, through which gas can flow and which connects the first gas through-opening and the second gas through-opening to one another. Such a form of construction is particularly suitable when the spacer element is to surround a gas channel, which penetrates the fuel cell stack.

In principle, the first structural part and the second structural part, between which the spacer element is disposed, may be any desired structural parts of the same fuel cell unit or of two different fuel cell units.

In order to be able to keep two mutually opposite housing walls of a housing of a fuel cell unit apart from one another and hence prevent a collapse of the housing owing to the application force acting upon the housing, it may be provided that the first structural part takes the form of a first housing wall of a fuel cell unit and the second structural part takes the form of a second housing wall of a fuel cell unit.

The spacer element may in particular comprise a metal material, preferably a sheet steel.

It is particularly advantageous when the spacer element is formed substantially completely from a metal material, preferably from a sheet steel.

Such a spacer element is particular easy to manufacture and handle.

Claim 27 is directed to a fuel cell unit, which comprises a housing with a first housing wall and a second housing wall as well as at least one spacer element according to the invention, which lies against the first housing wall and against the second housing wall and holds the first housing wall and the second housing wall apart from one another.

In a special development of such a fuel cell unit, it is provided that the first housing wall has a first gas through-opening and the second housing wall has a second gas through-opening and that the spacer element has an interior, through which gas can flow and which connects the first gas through-opening and the second gas through-opening to one another.

The spacer element according to the invention prevents the mutually opposite housing walls from being deformed by the sealing surface pressure acting upon the housing by virtue of the fact that the spacer element absorbs the sealing surface pressure acting upon the housing and serves as a support element, which prevents a collapse of the housing, thereby allowing an application force, which is sufficient for adequate cohesion of the fuel cell stack, to be introduced into the fuel cell stack.

Because of the deformation stability of the housing being increased by means of the at least one spacer element, the deformation stability inherent in the material of the housing walls is no longer important, so that as a material for the housing walls it is even possible to use a material, which is easily deformable at the high operating temperatures of a fuel cell unit, in particular of a high-temperature SOFC unit, but from which the component parts of the housing are particularly easy to manufacture, such as e.g. steel, in particular special steel.

In particular, the spacer element according to the invention allows the housing of the fuel cell unit to be formed from shaped sheet-metal parts, which are manufactured by one or more forming operations, e.g. by embossing and/or deep-drawing, from a metal sheet, in particular from a high-temperature-resistant special steel sheet or a steel sheet coated with an inorganic or ceramic material.

The spacer element according to the invention is particularly suitable for use in a high-temperature SOFC unit, the operating temperature of which lies in the range of approximately 600° C. to approximately 1000° C.

Further features and advantages of the invention are the subject matter of the following description and the graphic representation of embodiments.

BRIEF DESCRIPTION OF THE DRAWINGS

FIG. 3 a diagrammatic section through a housing upper part and a housing lower part of a fuel cell unit and a spacer element disposed between the two housing parts, in the region of a gas channel penetrating the fuel cell unit;

FIG. 4 a diagrammatic plan view of the spacer element of FIG. 3;

FIG. 5 a diagrammatic section through the spacer element of FIG. 4, along the line 5-5 in FIG. 4;

FIG. 7 an alternative form of construction of a spacer element blank, which has been punched from a flat sheet-metal plate and comprises four material layers, the centres of which lie at the corner points of a square;

FIG. 8 a further form of construction of a spacer element blank, which is punched from a flat sheet-metal plate and comprises two material layers;

FIG. 9 a diagrammatic plan view of a spacer element manufactured from the blank shown in FIG. 8 by folding the two material layers one on top of the other;

FIG. 10 a diagrammatic section through the spacer element of FIG. 9 along the line 10-10 in FIG. 9, and FIG. 11 a further form of construction of a spacer element blank, which is punched out of a flat sheet-metal plate and comprises eight material layers, the centres of which are disposed along a straight line.

In all of the drawings, identical or functionally equivalent elements are denoted by the same reference characters.

DETAILED DESCRIPTION OF THE INVENTION

Figure 1:
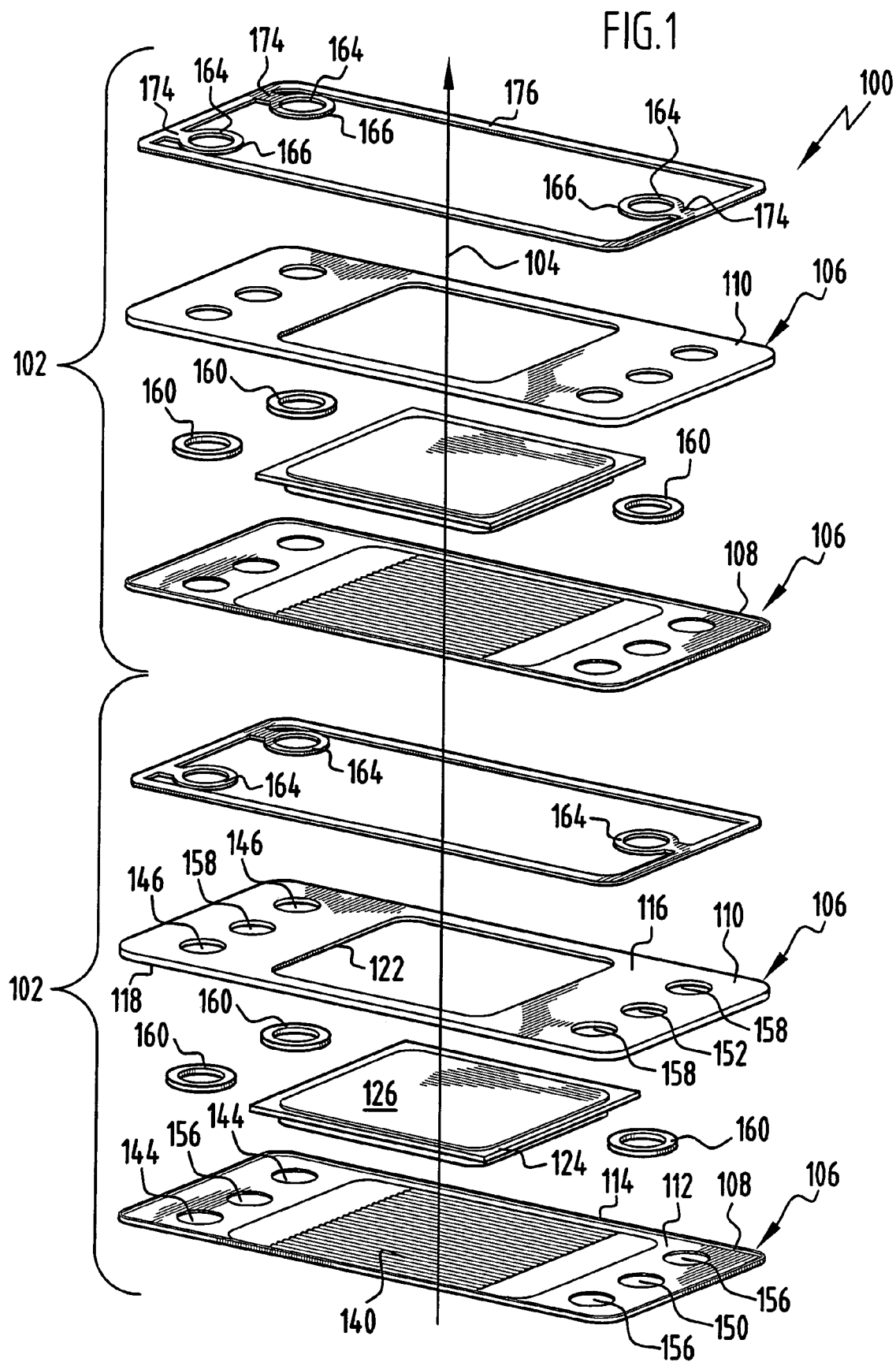
FIG. 1 a diagrammatic exploded view of a fuel cell stack comprising a plurality of fuel cell units, which are disposed successively along a stacking direction and of which two are shown in FIG. 1.
Figure 2:
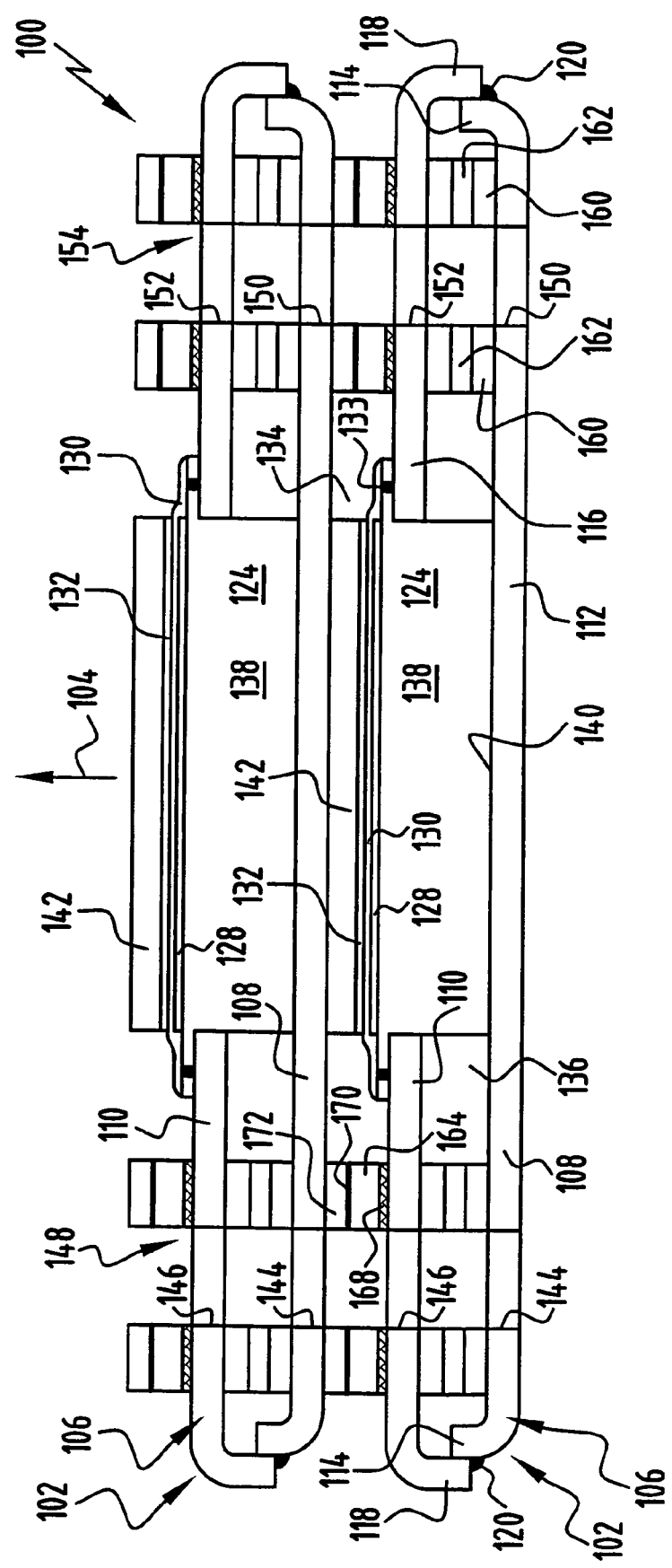
FIG. 2 a diagrammatic section through the fuel cell stack.

A fuel cell stack, which is illustrated in FIGS. 1 to 3 and denoted as a whole by 100, comprises a plurality of fuel cell units 102 each of an identical design, which are stacked one on top of the other along a vertical stacking direction 104.

Each of the fuel cell units 102 comprises a housing 106, which is composed of a housing lower part 108 and a housing upper part 110.

The housing lower part 108 takes the form of a shaped sheet-metal part and comprises a plate 112, which is aligned substantially at right angles to the stacking direction 104 and at its edges merges into a marginal flange 114, which is bent round substantially parallel to the stacking direction 104.

The housing upper part 110 likewise takes the form of a shaped sheet-metal part and comprises a plate 116, which is aligned substantially at right angles to the stacking direction 104 and at its edges merges into a marginal flange 118, which is bent round substantially parallel to the stacking direction 104 and directed towards the housing lower part 108 and engages over the marginal flange 114 of the housing lower part 108.

The marginal flange 118 of the housing upper part 110 is connected along a circumferential weld seam 120 in a gastight manner to the marginal flange 114 of the housing lower part 108.

The housing upper part 110 and the housing lower part 108 are preferably manufactured from an extremely corrosion-resistant steel, e.g. from the alloy Crofer 22.

The material, Crofer 22, has the following composition: 22 percent by weight chromium, 0.6 percent by weight aluminium, 0.3 percent by weight silicon, 0.45 percent by weight manganese, 0.08 percent by weight titanium, 0.08 percent by weight lanthanum, the remainder being iron.

This material is sold by the company, Thyssen Krupp VDM GmbH, Plettenbergerstr. 2, 58791 Werdohl, Germany.

The housing upper part 110 has a substantially rectangular through-opening 122, which accommodates a substantially cuboidal substrate 124, which carries on its upper side a cathode-electrolyte-anode unit 126.

The cathode-electrolyte-anode unit (CEA unit) 126 comprises an anode 128 disposed directly on the upper side of the substrate 124, an electrolyte 130 disposed on top of the anode 128, and a cathode 132 disposed on top of the electrolyte 130.

The anode 128 is formed from a ceramic material that is electrically conductive at the operating temperature of the fuel cell unit (of approximately 800° C. to approximately 900° C.), being formed for example from $ZrO_2$ or from an $NiZrO_2$ cermet (ceramic-metal mixture), which is porous in order to allow a combustion gas, which passes through the substrate 124, to pass through the anode 128 to the electrolyte 130 adjoining the anode 128.

As a combustion gas, it is possible to use e.g. a hydrocarbon-containing gas mixture or pure hydrogen.

The electrolyte 130 preferably takes the form of a solid electrolyte and is formed, for example, from yttrium-stabilized zirconium dioxide.

The cathode 132 is formed from a ceramic material, which is electrically conductive at the operating temperature, for example from $(La_{0.8}Sr_{0.2})_{0.98}MnO_3$, and is porous in order to allow an oxidant, e.g. air or pure oxygen, from an oxidant chamber 134 adjoining the cathode 132 to pass through to the electrolyte 130.

The gastight electrolyte 130 extends beyond the edge of the gas-permeable anode 128 and beyond the edge of the gas-permeable cathode 132 and lies with its underside directly on the upper side of an edge region of the substrate 124. The edge region of the substrate 124 is welded in a gastight manner to the housing upper part 110, wherein by virtue of the welding operation a gastight zone 133 is formed in the edge region of the substrate 124 and extends through the entire height of the edge region of the substrate 124.

This gastight zone 133 is covered by the electrolyte 130 so that the combustion gas chamber 136 of the fuel cell unit 102 formed by the inner region of the substrate 124 and the gap between the housing lower part 108 and the housing upper part 110 is separated in a gastight manner from the oxidant chamber 134 situated above the electrolyte 130.

The substrate 124 may, for example, take the form of a metallic knitted fabric, a metallic woven fabric, a metallic braided fabric, a metallic non-woven fabric and/or a porous body made of sintered or compacted metal particles.

As the substrate 124 is in electrically conducting contact with the anode 128, the substrate 124 is also referred to as anode contact body 138.

At its underside remote from the anode, the anode contact body 138 is soldered to a contact bank 140, which is disposed centrally on the housing lower part 108.

The contact bank 140 may be designed, for example, in the shape of a corrugated sheet.

The cathode 132 is connected in an electrically conducting manner to a cathode contact body 142 (not shown in the exploded view of FIG. 1), which is disposed above the CEA unit 126 and of which the upper side remote from the cathode 132 is soldered to the underside of the housing lower part 108 of a further fuel cell unit 102 situated above it in the stacking direction 104.

The cathode 132 of each fuel cell unit 102 is therefore connected by the cathode contact body 142, the housing lower part 108 of the adjacent fuel cell unit 102 and the anode contact body 138 of the adjacent fuel cell unit 102 in an electrically conducting manner to the anode 128 of the fuel cell unit 102 situated above it in the stacking direction 104.

During operation of the fuel cell stack 100, the CEA unit 126 of each fuel cell unit 102 has a temperature of e.g. approximately 850° C., at which the electrolyte 130 is conductive for oxygen ions. The oxidant from the oxidant chamber 134 acquires electrons at the cathode 132 and transfers bivalent oxygen ions to the electrolyte 130, which migrate through the electrolyte 130 to the anode 128. At the anode 128, the combustion gas from the combustion gas chamber 136 is oxidized by the oxygen ions from the electrolyte 130 and in the process transfers electrons to the anode 128.

The electrons liberated during the reaction at the anode 128 are supplied from the anode 128 via the anode contact body 138, the housing lower part 108 and the cathode contact body 142 to the cathode 132 of an adjacent fuel cell unit 100 and hence enable the cathode reaction.

In order to be able to supply combustion gas to the combustion gas chambers 136 of the fuel cell units 102, the housing lower parts 108 are provided with combustion-gas through-openings 144 and the housing upper parts 110 with combustion-gas through-openings 146, which are mutually aligned, so that vertical combustion gas channels 148 penetrating the combustion-gas through-openings 144, 146 are formed.

In order to be able to remove waste gas from the fuel cell stack 100, the housing lower parts 108 are provided with waste-gas through-openings 150 and the housing upper parts 110 with waste-gas through-openings 152, which are mutually aligned, so that one or more vertical waste gas channels 154 penetrating the waste-gas through-openings 150, 152 are formed.

In order to be able to supply oxidant to the oxidant chambers 134 of the fuel cell units 102 and remove excess oxidant from the fuel cell stack 100, the housing lower parts 108 are provided with oxidant through-openings 156 and the housing upper parts 110 with oxidant through-openings 158, which are mutually aligned, so that vertical oxidant channels penetrating the oxidant through-openings 156, 158 are formed.

However, in order to prevent an electric short circuit, the housings 106 of fuel cell units 102 disposed successively along the stacking direction 104 have to be electrically insulated from one another. In order to achieve this electric insulation effect, between the upper side of the housing upper part 110 of each fuel cell unit 102 and the underside of the housing lower part 108 of the fuel cell unit 102 situated above there are disposed components, which have an electric insulation effect at the operating temperature of the fuel cell stack 100 and are referred to hereinafter as insulation elements 164.

Each of the insulation elements 164 is of a substantially annular design, with the ring axis aligned parallel to the stacking direction 104, and encircles in each case one of the combustion gas channels 148 or one of the waste gas channels 154.

Each insulation element 164 comprises an annular basic body 166 made of a metal alloy, which contains aluminium.

In particular, the basic body 166 may be formed from a steel alloy that is known by the designation "FeCrAlY" or "Aluchrom Y".

The composition of the FeCrAlY alloy is as follows: 30 percent by weight chromium, 5 percent by weight aluminium, 0.5 percent by weight yttrium, the remainder being iron.

The underside of the annular basic body 166 is connected by a solder layer 168 to the upper side of a housing upper part 110.

Disposed on the upper side of the annular basic body 166 is an insulation layer 170 of aluminium oxide, which is electrically insulating at the operating temperature of the fuel cell stack 100 and which has been produced by oxidation of aluminium from the metal alloy of the basic body 166.

As the insulation element 164 surrounds a combustion gas channel 148 and the combustion gas channel 148 has to be separated in a gastight manner from the oxidant chamber 134 surrounding the insulation element 164, there is disposed between the insulation layer 170 of the insulation element 164 and the underside of the adjacent housing lower part 108 an annular sealing element 172, which is formed from a gastight material, e.g. from a ceramic sealing compound.

Examples of ceramic sealing compounds suitable for this purpose are known in particular from DE 102 06 863 A1.

By means of the sealing element 172 made of the ceramic sealing compound the insulation element 164 is connected adhesively to the adjacent housing lower part 108, wherein at the same time the gas channel surrounded by the insulation element 164 is separated in a gastight manner from the exterior of the insulation element 164.

To allow the insulation elements 164, which are disposed in each case between the housings 106 of two fuel cell units 102, to be handled easily as a unit, it may be provided that these annular insulation elements 164 are connected in each case by a web 174 to a substantially rectangular frame 176, wherein the frame 176 and the webs 174, like the annular insulation elements 164 themselves, are formed from a basic body made of the metal alloy and an aluminium oxide layer produced on the upper side of the basic body (see FIG. 1).

In order to increase the mechanical stability of the housings 106 of the fuel cell units 102, between the housing lower part 108 and the housing upper part 110 of each fuel cell unit 102 spacer elements 160 are disposed, which encircle the combustion gas channels 148 and the waste gas channels 154 respectively and have radial gas through-channels 162 in order to allow the passage of combustion gas from the combustion gas channels 148 into the combustion chambers 136 and the passage of waste gas from the combustion gas chambers 136 into the combustion gas channels 154 respectively.

These spacer elements 160 are only diagrammatically illustrated in FIGS. 1 and 2.

One of these spacer elements 160, which for example encircles one of the waste gas channels 154, is illustrated in detail in FIGS. 3 to 5.

This spacer element 160 comprises four material layers 180, which are disposed successively along the stacking direction 104 and each take the form of a substantially flat plate 182.

Figure 6:
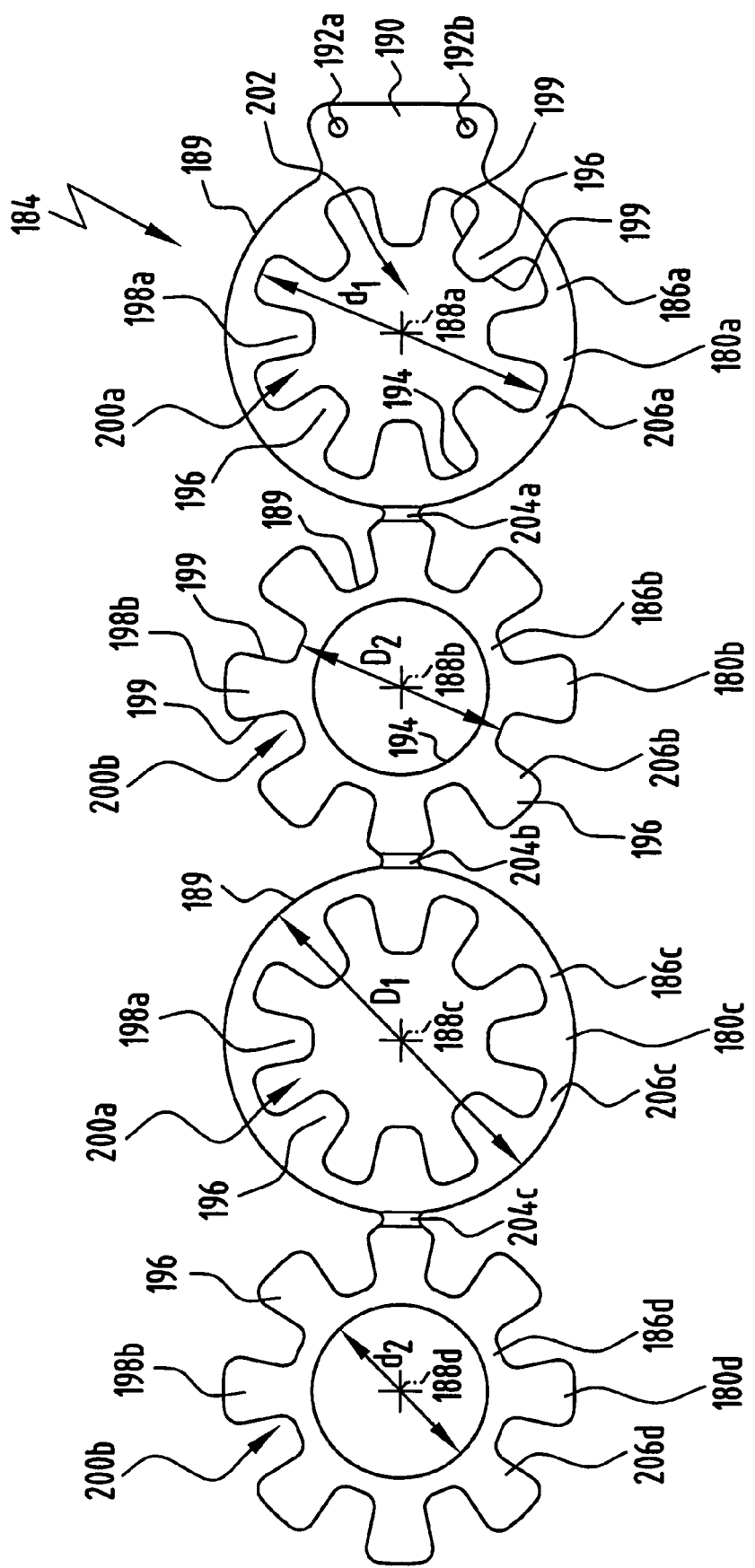
FIG. 6 a spacer element blank, which has been punched from a flat sheet-metal plate and comprises four material layers having centres disposed along a straight line.

The spacer element 160 is formed from the spacer element blank 184, which is illustrated in FIG. 6 and is punched or cut from a starting material, e.g. from a metal material, preferably from a sheet steel.

The spacer element blank 184 comprises a first material layer 180a with a first carrier element 186a, which has substantially the shape of a ring having the ring outside diameter $D_1$ and the ring inside diameter $d_1$.

Projecting outwards from the outer side 189 of the first carrier element 186a remote from the centre line 188a is a fixing lug 190, by means of which the spacer element 160 is fastenable to one of the housing parts of the fuel cell unit 102, e.g. to the upper side of the housing lower part 108, (see FIG. 3).

The fastening of the fixing lug 190 to the housing part may be effected in particular by welding, e.g. at the weld points 192a, 192b, to the relevant housing part.

Otherwise, the outer side 189 of the first carrier element 186a is substantially ring-shaped.

Projecting in radial direction from the inner side 194 of the carrier element 186a facing the centre line 188a of the material layer 180a is a plurality of, e.g. eight, channel-delimiting elements 196 in the form of first channel-delimiting lugs 198a, which terminate at a distance $d_2/2$ from the centre line 188a of the first material layer 180.

The first channel-delimiting lugs 198a taper with diminishing distance from the centre line 188a, so that their lateral edges 199 extend substantially radially, and are spaced apart from one another along the peripheral direction of the carrier element 188a, so that between each two channel-delimiting elements 196 disposed successively along the periphery of the carrier element 186a there is formed an inner gas through-channel portion 200a, which is bounded on either side by a first channel-delimiting lug 198a and at its radially outer end by the carrier element 186a but at its radially inner end opens out into the ring interior 202 of the first material layer 180a.

A second material layer 180b comprises a second carrier element 186b, which has substantially the shape of a ring having the ring inside diameter $d_2$ and the ring outside diameter $D_2$.

The ring inside diameter $d_2$ of the second carrier element 186b substantially corresponds to the diameter of the gas through-openings 150, 152 in the housing lower part 108 and the housing upper part 110 respectively.

Projecting radially outwards from the outer side 189 of the second material layer 180b remote from the centre line 188b of the second material layer 180b is a plurality of, e.g. eight, channel-delimiting elements 196 in the form of second channel-delimiting lugs 198b.

The number of second channel-delimiting lugs 198b corresponds to the number of first channel-delimiting lugs 198a of the first material layer 180a.

The second channel-delimiting lugs 198b extend radially outwards to a radially outer end region, which is at the distance of $D_1/2$ from the centre line 188b.

The second channel-delimiting lugs 198b are spaced apart from one another along the periphery of the carrier element 186b, so that between each two channel-delimiting elements 196 disposed successively in the peripheral direction of the carrier element 186 there is formed an outer gas through-channel portion 200b, which is bounded on either side by a second channel-delimiting lug 198b and in a radially inward direction by the second carrier element 186b, while at its radially outer end it opens towards the outer side of the material layer 180b.

The second channel-delimiting lugs 198b are distributed equidistantly and at constant angular distances from one another along the periphery of the second carrier element 186b.

The second channel-delimiting lugs 198b widen with increasing distance from the centre line 188b of the second material layer 180b, so that their lateral edges 199 extend substantially radially.

The radially outer edge of one of the second channel-delimiting lugs 198b facing the first material layer 180a is connected by a bending region 204a to the outer side 189 of the first carrier element 186a of the first material layer 180a.

The inner side 194 of the second carrier element 186b facing the centre line 188b of the second material layer 180b is substantially circular.

The spacer element blank 184 comprises a third material layer 180c, which is of substantially the same construction as the first material layer 180a except that there is no fastening lug 190 projecting outwards from the outer side 189 of the carrier element 186c of the third material layer 180c, the circular outer side 189 of the carrier element 186c instead being connected by a bending region 204b to a radially outer edge of one of the second channel-delimiting lugs 198b of the second material layer 180b.

The spacer element blank 184 further comprises a fourth material layer 180*d*, which is of substantially the same construction as the second material layer 180*b*, with the sole difference that the fourth material layer 180*d* is connected merely at the radially outer edge of one of the second channel-delimiting lugs 198*b* by a bending region 204*c* to the outer side 189 of the carrier element 186*c* of the third material layer 180*c*, the channel-delimiting lug that lies opposite this channel-delimiting lug 198*b* connected to the third material layer 180*c* however not being connected to a further material layer.

From the previously described spacer element blank 184 the finished spacer element 160 illustrated in FIGS. 3 to 5 is formed by bending or folding operations.

For this purpose, first of all, at the bending region 204*a* disposed between the first material layer 180*a* and the second material layer 180*b* the second material layer 180*b* is folded through an angle of approximately 180° onto the first material layer 180*a* in such a way that the upper side 206*b* of the second material layer 180*b* lies flat on the upper side 206*a* of the first material layer 180*a*, namely in such a way that the second channel-delimiting lugs 198*b* of the second material layer 180*b* lie flat on the first channel-delimiting lugs 198*a* of the first material layer 180*a*, wherein the lateral edges 199 of the channel-delimiting lugs 198*a*, 198*b* extend substantially parallel to one another and the radially inner edges of the first channel-delimiting lugs 198*a* of the first material layer 180*a* are overlapped by the carrier element 186*b* of the second material layer 180*b*, while the carrier element 186*a* of the first material layer 180*a* lends support in a downward direction to the radially outer end regions of the second channel-delimiting lugs 198*b* of the second material layer 180*b*.

During this folding operation, the bending region 204*a* between the first material layer 180*a* and the second material layer 180*b* is bent into a substantially U-shaped configuration.

Then, at the bending region 204*b* between the second material layer 180*b* and the third material layer 180*c* the third material layer 180*c* is folded through an angle of approximately 180° in such a way onto the second material layer 180*b* that the underside 208*c* of the third material layer 180*c* lies flat on the underside 208*b* of the second material layer 180*b*, wherein the bending region 204*b* is bent into an, in cross section, substantially U-shaped configuration.

Finally, at the bending region 204*c* between the third material layer 180*c* and the fourth material layer 180*d* the fourth material layer 180*d* is folded in such a way through an angle of approximately 180° onto the third material layer 180*c* that the upper side 206*d* of the fourth material layer 180*d* lies flat on the upper side 206*c* of the third material layer 180*c*, wherein the bending region 204*c* is bent into an, in cross section, substantially U-shaped configuration.

As the ring inside diameter $d_1$ of the carrier elements 186*a*, 186*c* of the first material layer 180*a* and the third material layer 180*c* is greater than the ring outside diameter $D_2$ of the carrier elements 186*b*, 186*d* of the second material layer 180*b* and the fourth material layer 180*d*, the carrier elements 186 of material layers 180 disposed successively along the stacking direction 104 are mutually offset in each case in the radial direction of the spacer element 160, so that between the carrier elements 186 of successive material layers 180 there is formed in each case a gap 210, by means of which in each case an inner gas through-channel portion 200*a* of the first material layer 180*a* or of the third material layer 180*c* is connected in each case to an outer gas through-channel portion 200*b* of the second material layer 180*b* or of the fourth material layer 180*d*, so that in each case an inner gas through-channel portion 200*a* and an associated outer gas through-channel portion 200*b* as well as the associated gap 210 between the carrier elements 186 forms a gas through-channel 212, which—viewed in a vertical cross section through the spacer element 160—is stepped and opens via the respective associated inner gas through-channel portion 200*a* into the ring interior 202 of the spacer element 160 and via the respective associated outer gas through-channel portion 200*b* at the outer side of the spacer element 160, so that a gas may flow through the gas through-channel 212 from the combustion chamber 136 encircling the spacer element 160 into the waste gas channel 154 penetrating the ring interior 202 of the spacer element 160 (see FIG. 3).

The carrier elements 186 and channel-delimiting elements 196 stacked one on top of the other in the stacking direction 104 therefore form an annular support wall 220 of the spacer element 160 that is penetrated from its inner side to its outer side by a plurality of gas through-channels 212.

As may best be seen from FIG. 3, the spacer element 160 is fastened in such a way by means of the fixing lug 190 to the upper side of the housing lower part 108 of the fuel cell unit 102 that the circular inner sides 194 of the carrier elements 186*b*, 186*d* of the second material layer 180*b* and of the fourth material layer 180*d* are substantially aligned with the waste gas through-openings 150, 152 in the housing lower part 108 and in the housing upper part 110 respectively.

The spacer elements 160 disposed at the combustion gas channels 148 are of exactly the same construction as the spacer elements 160 disposed at the waste gas channels 154 but have gas flowing through in the opposite direction, i.e. the combustion gas from the combustion gas channels 148 flows from the ring interiors 202 of the spacer elements 160 at the combustion gas channels 148 through the gas through-channels 212 into the combustion chambers 136 encircling the spacer elements 160.

As may best be seen from FIG. 3, each of the spacer elements 160 in the fully assembled state of the fuel cell unit lies with the underside 208*a* of the first material layer 180*a* flat against the upper side of the housing lower part 108 and with the (upwardly folded) underside 208*d* of the fourth material layer 180*d* flat against the underside of the housing upper part 110 of the fuel cell unit 102.

By virtue of the spacer element 160 lying flat against the adjacent housing parts 108, 110 of the fuel cell unit 102, as uniform a distribution as possible of the sealing pressure on the spacer element 160 is achieved in the assembled state.

The gas through-channels 212 formed in the spacer element 160 enable an exchange of gas between the ring inner side and the ring outer side of the spacer element 160 with only a low flow resistance.

By selecting the thickness of the starting material, from which the spacer element blank 184 is punched or cut, the overall height of the finished spacer element 160 may be set to any desired value.

It is moreover also possible to reduce or increase the number of material layers 180 forming the spacer element 160 in order in this way to achieve a smaller or greater fitted thickness of the spacer element 160.

Furthermore, a plurality of spacer elements 160, which are not integrally connected to one another, might be stacked one on top of the other in order to bridge the distance between the housing parts 108, 110 of the fuel cell unit 102.

In the case of the spacer element blank 184 illustrated in FIG. 6 and described above, four material layers 180 punched or cut from a starting material are disposed in such a way that their centres 188 all lie in the same vertical plane.

An alternative spacer element blank 184 illustrated in FIG. 7 differs from the spacer element blank illustrated in FIG. 6 only in that the material layers 180 are interconnected in such a way by bending regions 204 that the centres 188 of the material layers 180, instead of all lying in the same plane, are aligned along four parallel edges of a cube.

In other words, a first straight connecting line 214a, which connects the centre 216a of the first material layer 180a to the centre 216b of the second material layer 180b, is aligned at right angles to a second straight connecting line 214b, which connects the centre 216b of the second material layer 180b to the centre 216c of the third material layer 180c.

Furthermore, in the spacer element blank 184 illustrated in FIG. 7, a third straight connecting line 214c, which connects the centre 214c of the third material layer 180c to the centre 214d of the fourth material layer 180d, is disposed substantially at right angles to the second straight connecting line 214b.

This results in an extremely compact spacer element blank 184, which has a far smaller maximum extension than the spacer element blank illustrated in FIG. 6 and is particularly suitable for preventing material waste when the spacer element blank 184 is to be punched or cut from sheet-metal disks of the diameter δ.

Otherwise, the spacer elements 160 folded from the spacer element blank 184 according to FIG. 7 are structurally and functionally identical to the previously described spacer elements 160 folded from the spacer element blank 184 according to FIG. 6.

When manufacturing a fuel cell unit 102, the finished folded spacer elements 160 are laid by the underside 208a of the first material layer 180a onto the upper side of the housing lower part 108 and connected in the region of the fixing lug 190 by welding to the housing lower part 108.

The housing upper part 110 is then placed onto the housing lower part 108 and connected to the housing lower part 108 by welding along the weld seams 120.

The basic bodies 166 of the insulation elements 164 are then soldered onto the upper side of the housing upper part 110 (soldering of the basic bodies 166 may however have already been carried out before the housing upper and lower parts 108, 110 are welded together).

The ceramic sealing compound is then applied onto the exposed upper side of the insulation layers 170 and/or onto the underside of the respective associated housing lower parts 108, and the housings 106 of the fuel cell units 102 of the fuel cell stack 100 are stacked one on top of the other, with the insulation elements 164 disposed in each case therebetween, after which the fuel cell stack 100 is dried at a temperature of e.g. approximately 70° C. to approximately 80° C.

Hardening of the sealing elements 172 made of the ceramic sealing compound is effected the first time the fuel cell stack 100 is heated up to its operating temperature.

In order to be able to set the application force, with which the spacer elements 160 and the insulation elements 164 are pressed against the housing parts 108, 110, to a desired value, the fuel cell stack 100 may be provided with a (non-illustrated) clamping device of the type described and illustrated e.g. in EP 1 278 258 A2.

In said case, a collapse of the housings 106 of the fuel cell units 102 under the application force acting upon the housings 106 is prevented by means of the spacer elements 160, by means of which the housing lower part 108 and the housing upper part 110 of the housing 106 of each fuel cell unit 102 are held apart from one another.

A further form of construction of a spacer element 160, which is illustrated in FIGS. 8 to 10, differs from the form of construction illustrated in FIGS. 3 to 6 substantially in that the form of construction illustrated in FIGS. 8 to 10 is composed of only two material layers 180a, 180b, which are folded one on top of the other and in the folded state lie with their mutually opposite end faces flat against one another.

As may best be seen from FIG. 10, in this form of construction too, the carrier elements 186a, 186b of the two material layers 180a, 180b are mutually offset in radial direction, so that the inner gas through-channel portions 200a of the first material layer 180a and the outer gas through-channel portions 200b of the second material layer 180b together with the gaps 210 between the carrier elements 186a, 186b form in each case a stepped gas through-channel 212, which connects the ring interior 202 of the spacer element 160 to the exterior of the spacer element 160.

As this form of construction of a spacer element 160 is only twice the height of the starting material, from which the spacer element blank 184 has been removed, this form of construction is particularly suitable for use in housings 106 of fuel cell units 102, in which the housing lower part 108 and the housing upper part 110 are at a relatively slight spacing from one another in the region of the combustion gas channels 148 and the waste gas channels 154.

Otherwise, the form of construction of a spacer element 160 illustrated in FIGS. 8 to 10 is identical in terms of its structure, function and method of manufacture to the form of construction illustrated in FIGS. 3 to 6.

Figure 11:
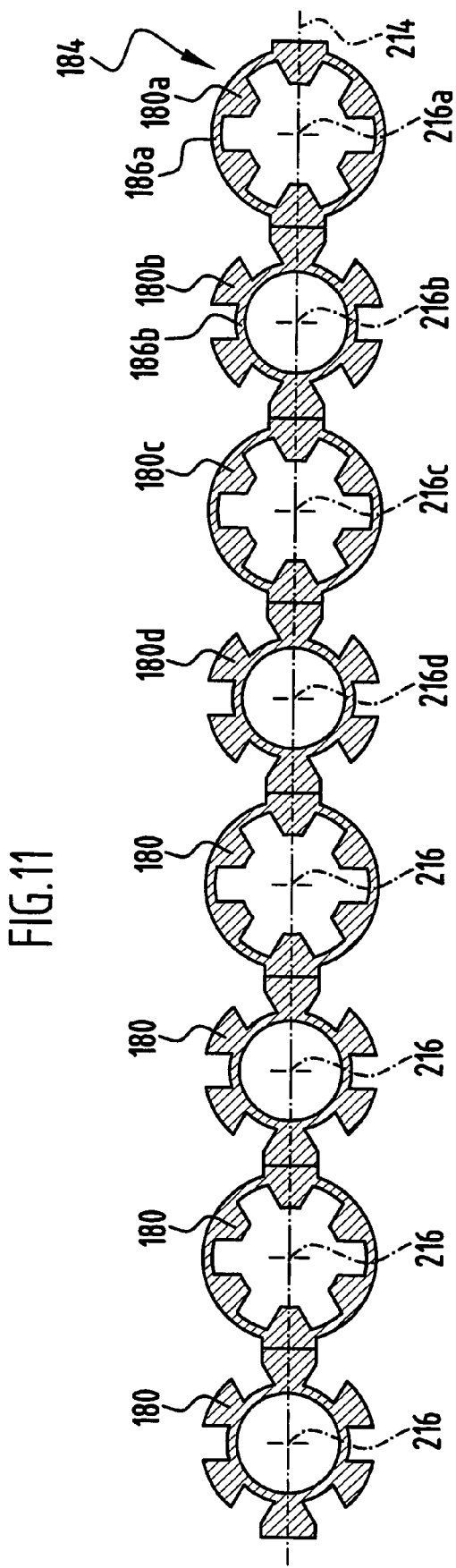

A further form of construction of a spacer element 160, the spacer element blank 184 of which is illustrated in FIG. 11, differs from the form of construction of a spacer element 160 illustrated in FIGS. 3 to 6 substantially only in that in the spacer element 160 illustrated in FIG. 11 eight material layers 180, instead of only four material layers 180, are folded one on top of the other.

Given an identical thickness of the starting material, from which the spacer element blank 184 is removed, this makes it possible to achieve a height, i.e. an extension parallel to the stacking direction 104, of the spacer element 160 that is double that of the form of construction illustrated in FIGS. 3 to 6.

The spacer element blank 184 illustrated in FIG. 11 is of a linear construction, i.e. the centres 216 of the material layers 180 are all disposed along a straight connecting line 214.

For improved utilization of the starting material, from which the spacer element blank 184 is removed, it may however also be provided that the spacer element blank 184 is of an angular construction, similar to the spacer element blank illustrated in FIG. 7, i.e. the straight connecting lines 214, which connect the centres 216 of successive material layers 180 in the spacer element blank 184 to one another, are aligned transversely of, preferably substantially at right angles to, one another.

Otherwise, the form of construction of a spacer element 160 illustrated as a spacer element blank 184 in FIG. 11 is identical in terms of its structure, function and method of manufacture to the form of construction illustrated in FIGS. 3 to 6.

The invention claimed is:

1. Spacer element for a fuel cell stack that in the assembled state of the fuel cell stack lies adjacent to a first structural part of a fuel cell unit of the fuel cell stack and to a second structural part of a fuel cell unit of the fuel cell stack and holds the first structural part and the second structural part apart from one another, comprising a support wall with an inner side and an outer side and at least one gas through-channel penetrating the support wall from the inner side to the outer side, wherein the support wall of the spacer element comprises at least two material layers, which are stacked one on top of the other along a stacking direction, wherein at least one of the material layers comprises a carrier element, which extends in a peripheral direction of the spacer element, and at least two channel-delimiting elements, which project transversely of the peripheral direction from the carrier element and form lateral boundaries of a portion of a gas through-channel of the spacer element, wherein, in the assembled state of the spacer element, each material layer of the stack defines a layer plane and the same layer plane contains both the carrier element and the at least two channel-delimiting elements.

2. Spacer element according to claim 1, wherein the carrier element takes the form of a closed ring.

3. Spacer element according to claim 1, wherein the carrier element is substantially annular or part-annular and the channel-delimiting elements project in substantially radial directions from the carrier element.

4. Spacer element according to claim 1, wherein channel-delimiting elements projecting from the carrier element are disposed substantially equidistantly from one another along the peripheral direction of the spacer element.

5. Spacer element according to claim 1, wherein the carrier element has an inner side facing a centre line of the material layer and an outer side facing away from the centre line of the material layer and that all of the channel-delimiting elements, which project from the carrier element, project either all from the inner side or all from the outer side of the carrier element.

6. Spacer element according to claim 1, wherein the spacer element comprises at least one first material layer having a first carrier element and at least two first channel-delimiting elements, which project from the first carrier element and form lateral boundaries of a first gas through-channel portion, and at least one second material layer having a second carrier element and at least two second channel-delimiting elements, which project from the second carrier element and form lateral boundaries of a second gas through-channel portion, wherein the first carrier element and the second carrier element in the assembled state of the spacer element are mutually offset in such a way that between the first carrier element and the second carrier element there remains a gap, which connects the first gas through-channel portion and the second gas through-channel portion to one another.

7. Spacer element according to claim 6, wherein the first gas through-channel portion, the second gas through-channel portion and the gap together form a gas through-channel, which connects the inner side of the support wall of the spacer element to the outer side of the support wall of the spacer element.

8. Spacer element according to claim 6, wherein the first carrier element and the second carrier element each have an inner side facing the centre line of the respective material layer and an outer side facing away from the centre line of the respective material layer and that the first channel-delimiting elements project from the inner side of the first carrier element and the second channel-delimiting elements project from the outer side of the second carrier element or that the first channel-delimiting elements project from the outer side of the first carrier element and the second channel-delimiting elements project from the inner side of the second carrier element.

9. Spacer element according to claim 6, wherein the first material layer and the second material layer are of a substantially flat construction.

10. Spacer element according to claim 6, wherein the first material layer and the second material layer are integrally connected to one another.

11. Spacer element according to claim 6, wherein the first material layer and the second material layer are connected to one another by a region, which is bent in the assembled state of the spacer element.

12. Spacer element according to claim 6, wherein a channel-delimiting element of the first material layer is connected to the carrier element of the second material layer by a region, which is bent in the assembled state of the spacer element, or the carrier element of the first material layer is connected to a channel-delimiting element of the second material layer by a region, which is bent in the assembled state of the spacer element.

13. Spacer element according to claim 6, wherein the first material layer and the second material layer lie flat against one another in the assembled state of the spacer element.

14. Spacer element according to claim 6, wherein at least one channel-delimiting element of the first material layer and at least one channel-delimiting element of the second material layer lie flat against one another in the assembled state of the spacer element.

15. Spacer element according to claim 6, wherein the first material layer and the second material layer are folded one on top of the other in the assembled state of the spacer element.

16. Spacer element according to claim 1, wherein the spacer element comprises at least three material layers, which are folded one on top of the other in the assembled state of the spacer element.

17. Spacer element according to claim 16, wherein the spacer element is formed from a substantially flat spacer element blank, in which the centres of the material layers lie along a straight connecting line.

18. Spacer element according to claim 16, wherein the spacer element is formed from a substantially flat spacer element blank, in which the centres of the first material layer and of the second material layer lie along a straight connecting line and the centres of the second material layer and of the third material layer lie along a second straight connecting line, wherein the second straight connecting line is aligned transversely of the first straight connecting line.

19. Spacer element according to claim 18, wherein the spacer element comprises at least four material layers, which are folded one on top of the other in the assembled state of the spacer element, and that the centres of the third material layer and of the fourth material layer lie along a third straight connecting line, which is aligned transversely of the second straight connecting line.

20. Spacer element according to claim 1, wherein at least one of the material layers comprises a fixing lug, which projects beyond the external contours of the remaining material layers of the spacer element.

21. Spacer element according to claim 1, wherein the spacer element takes the form of a part that is separate from the first structural part and from the second structural part.

22. Spacer element according to claim 1, wherein the spacer element in the assembled state lies with a first contact surface flat against the first structural part and with a second contact surface flat against the second structural part.

23. Spacer element according to claim 1, wherein the first structural part has a first gas through-opening and the second structural part has a second gas through-opening and that the spacer element has an interior, through which gas can flow and which connects the first gas through-opening and the second gas through-opening to one another.

24. Spacer element according to claim 1, wherein the first structural part takes the form of a first housing wall of a fuel cell unit and the second structural part takes the form of a second housing wall of a fuel cell unit.

25. Spacer element according to claim 1, wherein the spacer element comprises a metal material.

26. Spacer element according to claim 1, wherein the spacer element is formed substantially completely from a metal material.

27. Fuel cell unit, comprising a housing having a first housing wall and a second housing wall and at least one spacer element according to claim 1, which lies against the first housing wall and against the second housing wall and keeps the first housing wall and the second housing wall apart from one another.

28. Fuel cell unit according to claim 27, wherein the first housing wall has a first gas through-opening and the second housing wall has a second gas through-opening and wherein the spacer element has an interior, through which gas can flow and connects the first gas through-opening and the second gas through-opening to one another.

29. Spacer element according to claim 14, wherein the at least one channel-delimiting element of the first material layer and the at least one channel-delimiting element of the second material layer lie substantially congruently, flat against one another in the assembled state of the spacer element.

30. Spacer element according to claim 18, wherein the second straight connecting line is aligned substantially at right angles to the first straight connecting line.

31. Spacer element according to claim 19, wherein the third straight connecting line is aligned substantially at right angles to the second straight connecting line.

32. Spacer element according to claim 25, wherein the metal material comprises a steel sheet.

33. Spacer element according to claim 26, wherein the metal material comprises a steel sheet.

* * * * *

UNITED STATES PATENT AND TRADEMARK OFFICE
CERTIFICATE OF CORRECTION

PATENT NO.      : 7,651,808 B2                              Page 1 of 1
APPLICATION NO. : 11/008058
DATED           : January 26, 2010
INVENTOR(S)     : Jürgen Clauss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twenty-third Day of November, 2010

David J. Kappos
*Director of the United States Patent and Trademark Office*